March 18, 1969 M. SCHLICHTE 3,433,900
CENTRALIZED DIGIT RECEIVER SYSTEM FOR A PLURALITY OF
TIME MULTIPLEX COMMUNICATION SYSTEMS
Filed Sept. 17, 1965
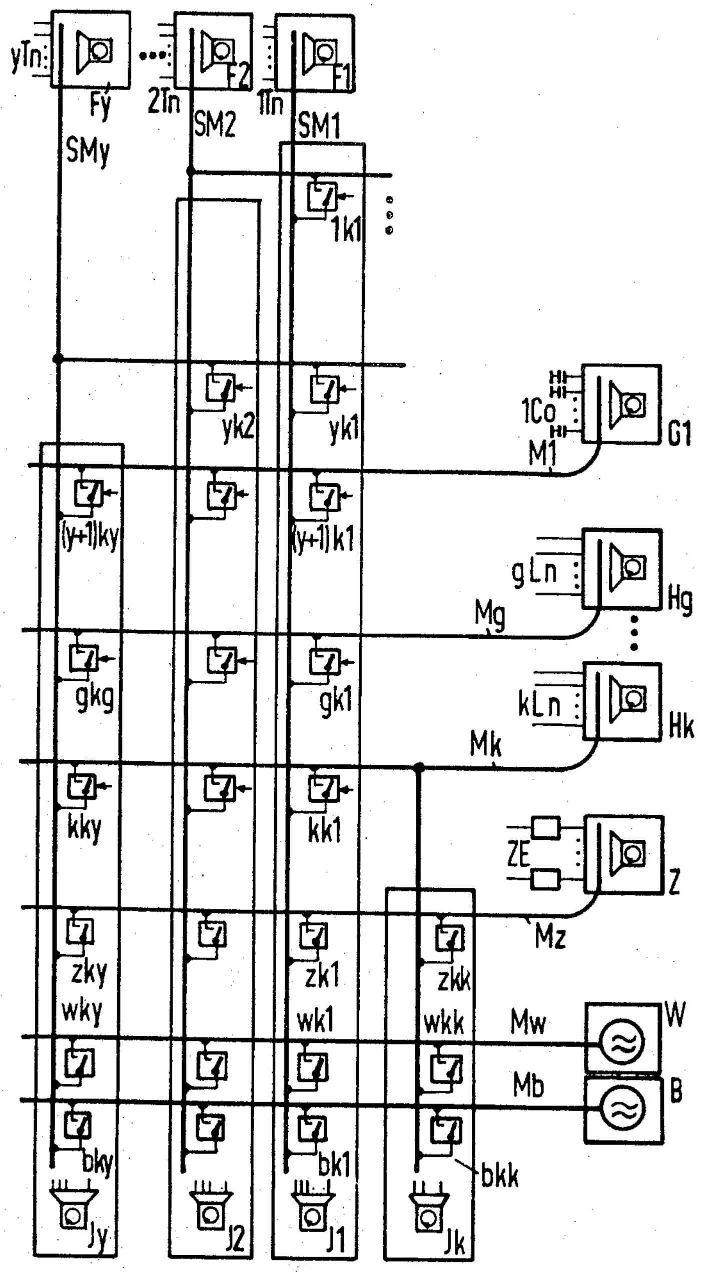

United States Patent Office 3,433,900
Patented Mar. 18, 1969

3,433,900

CENTRALIZED DIGIT RECEIVER SYSTEM FOR A PLURALITY OF TIME MULTIPLEX COMMUNICATION SYSTEMS

Max Schlichte, Munich, Germany, assignor to Siemens Aktiengesellschaft, Munich, Germany
Filed Sept. 17, 1965, Ser. No. 488,195
Claims priority, application Germany, Sept. 29, 1964, S 93,427
U.S. Cl. 179—15 4 Claims
Int. Cl. H04j 3/00; H04m 3/00

ABSTRACT OF THE DISCLOSURE

The present disclosure is of a system combining together a number of time multiplex communication systems, such as for telephony purposes. In order to save equipment cost, such apparatus as digit receivers which are designed to process dialing information are combined together in a separate or centralized time multiplex system, with a time multiplex line or highway which is connectible to the highways of the several time multiplex systems serving subscribers, by a matrix.

The present invention relates to circuit arrangements for handling the traffic between a plurality of time multiplex communication systems, particularly time multiplex telephone communicative systems.

The term system as used herein has reference to time multiplex communication systems generally, as well as to time multiplex telephone communication systems.

A circuit arrangement has been proposed previously in copending application Ser. No. 205,402, assigned to the assignee of the present application. Such previous circuit arrangement is adapted to handle the traffic between several time multiplex systems. Each system comprises a multiplex line or highway which serves both the outgoing and the incoming traffic. A special feature of said previous circuit arrangement is that the multiplex lines are the column lines of a multiple coupling bank. Such column lines, with one exception, are each permanently connected to a respective row line of the multiple coupling field or bank. The row line is additionally connectable by coupling point means, such as mechanical contacts or electronic switching means, to the column lines of the multiple coupling bank other than the one to which it is permanently connected. In the previously proposed circuit arrangement, the traffic between subscriber stations of different systems can be conducted in a single pulse phase by closing a coupling point contact between the respective column line of one of said systems and the row line which is permanently connected to a column line of the other of said systems. The traffic between subscriber stations of the same system can be conducted in two different pulse phases by closing a coupling point contact between the column line of the respective system and a row line serving as a multiplex line of a system which transmits (in a manner known per se) respective message-representing pulses of one pulse phase to intermediate or temporary storage means, which stores the pulses and permits energy withdrawal in the other pulse phase. Thus, all connections between subscribers of the several systems linked by the multiple coupling bank, can be made through such multiple coupling bank.

Such connections must, first of all be made and subsequently they must be interrupted. Therefore, it is an object of the present invention to provide certain auxiliary means which permit the performance of respective exchange steps.

It is another object of this invention to provide receiver means adapted for receiving and suitably handling dialing information which has been generated by a calling subscriber in accordance with the desired connection. Such suitable handling may initially involve the mere transmittal of said dialing informaton.

It is a further object of the invention to employ additional means for the purpose of establishing communication connections, such means comprising signal generators which permit transmittal to the respective subscribers to a connection to be made, information regarding the instantaneous status of the connection as it is being established.

In this connection it is known in the art (German patent publication 1,146,129) to provide receiver means, or so-called digit receivers, for the purpose of receiving dialing information which is generated by the parties or subscribers, in the form of multiple-frequency code signals. Such code signals are transmitted in the same manner as audio or talking currents. These digit receivers are adapted to be connected to a multiplex bus bar of the system by means of a respective time channel switch and during a pulse phase which has been assigned to the corresponding connection to be established.

It is further known (German patent publication 1,177,-214) to employ signal generators for sending signals to the subscribers of a multiplex system. Each of these signal generators is adapted to be connected to a multiplex bus bar of the system by means of a time channel switch and during a pulse phase which has been assigned to the corresponding connection to be established. Where a plurality of systems are involved as is presumed in the above-mentioned copending application, then it is possible to proceed in each system in the known manner.

It is a further important object of the present invention to provide in a circuit arrangement according to said copending application, additional possibilities for establishing connections so that transmitting and/or receiving means which serve for establishment of such connections, may be utilized for the benefit of the respective subscribers of all systems comprised in a time multiplex exchange device.

It is yet another object of the invention to provide a circuit arrangement which is capable of handling the traffic between a plurality of time multiplex communication systems, each of which comprises a multiplex line which serves both the incoming and the outgoing traffic.

Briefly, according to the invention there is provided a circuit arrangement for handling the traffic between a plurality of time multiplex communication systems, comprising a multiple coupling means such as a multiple coupling bank for linking said plurality of systems with each other. This coupling bank or field includes at least one special row means, such as a line or wire, a special time multiplex communication means, said special row means forming a multiplex line in said special time multiplex means, and a plurality of dialing information means, such as receivers for handling dial information generated by parties of all systems linked by said multiplex coupling bank, said dialing information beng represented by multiple-frequency code signals which are transmitted as talking or audio currents in a manner which is itself known. The dialing information means, or receivers, are linked or combined with each other, instead of with the subscribers in said special time multiplex communication means, said special row means or lines being connectable to column means, such as lines, of said time multiplex systems by connecting members such as coupling point contacts or electronic switching means, whereby traffic between a calling subscriber of any one system and any one of said dialing information receivers can be established during any one single pulse phase by closing the connecting member or coupling point contact between the column line of the corresponding system and said special row line.

The circuit arrangement according to the invention has the advantage that in a time multiplex exchange comprising a plurality of time multiplex communication systems, the traffic of which is handled through a circuit as disclosed in said copending application S.N. 205,402, the dialing information receivers required for receiving and handling of dialing information are combined in a special time multiplex means and that such dialing information receivers can be reached by the subscribers of all systems comprised in such time multiplex exchange. The above feature of the invention permits a more efficient use of such combined dialing information receivers, whereby a saving in the total number of required dialing information receivers is achieved.

A useful modification of the circuit may be employed when the multiple coupling bank is provided with additional row lines which serve as multiplex lines of systems combining lines which connect to other central offices, and where the combined lines are employed for handling incoming traffic. Such modification comprises the feature that the additional row lines are permanently connected to a respective additional column line of the multiple coupling bank. This additional column line additionally may be connected to the above-mentioned special row line (to which the digit receivers may be connected) by means of a connecting member, such as a coupling point contact. This feature makes it possible to establish a connection between a line incoming from another central office and a dialing information receiver during a single pulse phase, by closing said coupling contact between the column line of the respective central office system and the special row line.

In an especially useful embodiment of the invention, the multiple coupling bank comprises a plurality of additional special row lines which are connected with transmitting and/or receiving means serving to establish connections between the subscribers of all systems linked or combined through said multiple coupling bank. The special row lines may be connected to the column lines of said systems by means of coupling point contacts. This feature permits the handling of traffic between a subscriber and said transmitting and/or receiving means by closure of the coupling contact between the column line of the respective system and the respective additional special row line.

The connecting possiblities of this embodiment permit it to combine centrally the transmitting and/or receiving means which serve for establishing connections. As a result, such means can be utilized more efficiently. Particularly, a signal generator for each additional, special row line may be connected permanently to its respective special row line. The signal generator may be utilized for establishing a connection between subscribers of all time multiplex communication systems linked by the multiple coupling bank. In order to make possible connections between a line incoming from another central office and a signal generator, it is useful that the said additional column lines are also connectable to the said additional special row lines by closure of a coupling point contact.

In order that the invention may be clearly understood it will now be described, by way of example, with reference to the single figure of the accompanying drawing which is a block diagram of a preferred circuit arrangement in accordance with the present invention.

The diagram shows the essential elements of the circuit corresponding to FIG. 3 of the copending application, in order to illustrate the principle of the arrangement. Multiplex lines or highways SM1 to SM*y* of time multiplex telephone communication systems F1 to F*y* form in this circuit arrangement the column lines of a multiple coupling bank. Such column lines are each permanently connected to a row line of the multiple coupling bank with one exception. Each row line can be connected to one of the column lines not permanently connected thereto by means of coupling contacts 1*k*1 to *yk*2. The traffic between subscribers' lines 1T*n* to *y*T*n* of such different time multiplex telephone communication systems F1 to F*y* is handled through coupling contacts 1*k*1 to *yk*2. For this purpose the coupling contact between the column line of one system and the row line which is permanently connected to the column line of the other system, is closed periodically in a certain single pulse phase. For example, coupling point contact *yk*1 might be periodically closed in pulse phase P37 to connect subscriber 1T*n*3 to subscriber *y*T*n*7, the last digit representing the individual subscriber of the respective exchange.

The multiple coupling bank also includes row lines, such as row line M1, which cross the column lines SM1 to SM*y*. Row line M1 serves as a multiplex line of a time multiplex system G1, which transmits message pulses in a manner itself known to respective storage means 1C*o*. The traffic between subscriber stations of any one of the system F1 to F*y* is conducted over respective coupling contacts $(y+1)k1$ to $(y+1)ky$ which are operable to connect a respective row line M1 to one of said column lines SM1 to SM*y*. For this purpose, the coupling contact between the column line of the respective system and the row line M1 is closed periodically by each of two different phase pulses. For example, subscriber 1T*n*2 might be connected to multiplex line SM1 in pulse phase P24, and subscriber 1T*n*8 connected to the same line in pulse phase P54, the connection between the two subscribers being completed through row line M1 and temporary storage means 1C*o*, by closure of contacts $(y+1)k1$ in both pulse phases P24 and P54.

The multiple coupling bank also includes additional row lines, such as row lines M*g* and M*k* which serve as multiplex lines of time multiplex communication systems H*g* to H*k*. Lines *g*L*n* to *k*L*n*, which connect to other central offices, are connected to said systems H*g* to H*k*. Said column lines SM1 to SM*y* may also be connected to said additional row lines M*g*, M*k* by means of coupling contacts *gk*1 to *kky*. This features makes it possible to handle traffic between subscriber's lines 1T*n* to *y*T*n* and lines or trunks *g*L*n* to *k*L*n*, which connect to other central offices. In the circuit arrangement shown in the drawing lines *g*L*n*, for example, may be used only for outgoing traffic, whereas lines *k*L*n* may be used only for incoming traffic.

The multiple coupling bank also includes special row lines, such as row line M*z* which forms a multiplex line of a special time multiplex communication system Z. Instead of serving to combine or link subscribers, special system Z combines together dialing information receivers ZE which handle dialing information emitted by calling subscribers of all the systems F1 to F*y* which are linked by the multiple coupling bank. This dialing information may be represented by multiple-frequency code signals transmitted as audio signals in a manner itself known.

The transmission of dialing information need not be explained in detail, because it is not necessary for an understanding of the present invention.

Special row line M*z* may be connected to column lines SM1 to SM*y* of said systems F1 to F*y* by means of coupling contacts *zk*1 to *zky*. Furthermore, the multiple coupling bank includes an additional column line permanently connected to row line M*k*, which serves as a multiplex line of system H*k*. Row line M*k* may also be connected to special row line M*z* by means of coupling conpling contact *zkk*.

The handling of traffic between a calling subscriber's line of one of the multiplex systems F1 to F*y* and dialing information receiver ZE of the special communication multiplex system Z takes place in the following manner:

Let it be assumed as an example that a connection is to be established between a line of line group *y*T*n* of system F*y* and a dialing information receiver ZE, which may be a digit receiver. For this purpose a time channel switch (not shown) of the respective line is closed periodically by a certain phase pulse so that the said line is connected periodically to the multiplex line SM*y*. (It may be noted that this time channel switch has been mentioned in said copending application as a talking key.) The control pulse which causes this periodic closure has a predetermined phase position which differs from the phase positions of control pulses which may be assigned to other lines of the same system F*y*, as well as from phase positions of control pulses which may be assigned to busy digit receivers ZE of system Z.

A time channel switch (not shown) of system Z is closed in synchronism with the actuation of the time channel switch assigned to the line of line group *y*T*n*. The time channel switch of system Z connects digit receiver ZE which is seized by the said line of line group *y*T*n*, to multiplex line M*z* of system Z. This can be accomplished by the same auxiliary means which are provided in the said copending application for actuating the time channel switch in the individual systems F1 to F*y*. Thus, it is possible to provide in the special system Z a recirculating storage or memory wherein, during the respective pulse phases, code signals circulate as an address for designating the time channel switch of the digit receiver. Such code signals serve to produce a control pulse which then periodically closes the respective time channel switch each time such control pulse occurs.

The desired connection between a subscriber's line of a calling subscriber belonging to line group *y*T*n* and a digit receiver ZE assigned to the calling party for the receipt of dialing information, is accomplished in the following manner. The address of coupling contact *zky* circulates in the recirculating storage of device J*y*—which has been mentioned in said copending application—in such a manner that the resulting control pulse for the coupling contact which connects column line SM*y* with special row line MZ, has the same phase position as the control pulse which controls the time channel switch of said line group *y*T*n* and the time channel switch of dialing information receiver ZE, which has been seized by said line.

The above explanations apply also to connections of a digit receiver to another line of the same line group *y*T*n*, or of a different line group 1T*n*, 2T*n* . . . . Hence, each subscriber's line of systems F1 to F*y* can communicate with each dialing information receiver ZE, which therefore serve in common for all systems F1 to F*y*. The dialing information receivers are combined in the special time multiplex system Z.

A connection between a line incoming from another central office (illustrated in the drawing as belonging to line group *k*L*n*) and dialing information receiver ZE is possible in a corresponding manner. Such connection may be established by means of coupling contact *zkk*, which is provided in device J*k*, corresponding to devices J1 to J*y*.

The multiple coupling bank illustrated in the drawing further includes special row lines M*w* and M*b* to which are connected transmitting and/or receiving means which serve for establishing connections between parties of all systems linked by said multiple coupling bank. In the drawing a signal generator band W is shown permanently connected respectively to each of these further special row lines M*b* and M*w*. These signal generators are utilized for establishing a connection between the parties of all multiplex systems F1 to F*y* which are linked by the multiple coupling bank. Signal generator W, for example, can generate dialing signals, while signal generator B can generate busy signals. While the drawing does not show it, it is possible to provide further signal generators which would be permanently connected to respective further special row lines.

The special row lines M*w* and M*b* may be connected to column lines SM1 to SM*y* of systems F1 to F*y* by means of coupling contacts *wk*1 to *bky*. By means of these coupling contacts it is possible to establish connections between the signal generators and subscriber's lines 1T*n* to Y*n* of systems F1 to F*y* in the following manner:

If it is desired, for example, to establish a connection between dialing signal generator W and a line of line group 1T*n* of system F1, the time channel switch (not shown) of the respective line is closed periodically by a certain phase pulse so that such line is periodically connected to multiplex line SM1. The control pulse which causes such closure has a predetermined phase position which is distinguished from phase positions of control pulses assigned to other lines of the same system F1. Coupling contact *wk*1 which connects column line SM1 with row line M*w*, is closed periodically by the same phase pulse, so as to be in synchronism with the actuation of the time channel switch assigned to the said line. This may be accomplished by circulation of the address of the respective coupling contact *wk*1 in the recirculating storage device of device J1 in such a manner that the resulting control pulse has the same phase position as the control pulse which controls the time channel switch of the said line of line group 1T*n* in system F1.

In the circuit arrangement shown in the drawing, it is also possible for the signal generators to supply signals to lines or trunks incoming from other central offices. For this purpose, row lines M*w* and M*b* may be connected by means of coupling contacts *wkk* and *bkk* to that column line which is permanently connected to the above mentioned additional row line M*k* which serves as a multiplex line of system H*k*. For this purpose, coupling contacts *wkk* or *bkk* between the additional column line connected to row line M*k* of the multiple coupling bank, and the respective additional special row lines M*w* or M*b*, are closed periodically by a certain phase pulse.

It should be noted that the coupling contacts shown in the drawing need not be either single wire mechanical or electronic contacts. In accordance with the technique employed, such contacts may be two-wire or even four-wire contacts. With regard to four-wire contacts, the condition must be met that in connections made by such coupling contacts between two systems, a talking multiplex line of one system is connected to a listening multiplex line of the other system. If dialing information receivers ZE of special system Z operate solely as receivers, then special row line M*z* forms solely a receiving or listening multiplex line or wire; conversely, additional special row lines M*w* and M*b* form solely calling or talking lines or wires. If, in these instances, column lines SM1 to SM*y* comprise four lines or wires it is sufficient if coupling contacts *zk*1 to *bky* are two-wire contacts.

It is to be understood that the invention is not limited to the particular embodiments and features described and shown but that it comprises any modifications and equivalents within the scope of the appended claims.

I claim:

1. A switching arrangement over which the traffic of several time multiplex exchange systems (F1 to F*y*) is conducted, each of which exchange systems has a time multiplex line (SM1 to SM*y*) serving both incoming and outgoing traffic in a communication system, wherein the time multiplex lines form column lines of a coupling matrix, everyone but one of which is fixedly connected to a row line of the matrix, with the row lines each being selectively connectible over switch means with the column lines other than the one to which it is fixedly connected, so that traffic between subscriber stations of different time multiplex exchange systems may be effected by actuating the switch means operable to connect the row line which is fixedly connected to the time multiplex line of one exchange system to the time multiplex line of the other exchange system characterized by the fact that the matrix includes at least one additional special row line (MZ) serving as the time multiplex line of a special time multiplex exchange system (Z) common to said several exchange systems, said special system including a plurality of dialing information receivers (ZE) responsive to process coded dialing signals connectible to the special row line to respond to signals received over that line, and that the matrix includes switch means (*zk*1 to *zky*) selectively operable to connect said special row line to any of said column lines, so that dialing signals from a subscriber in any of said time multiplex exchange systems may be processed by a receiver forming part of said special system.

2. The apparatus of claim 1, further including incoming lines (*k*L*n*) from remote central offices combined together in an additional time multiplex comunications system (H*k*) which has an additional row line (M*k*) serving as a multiplex line in its additional system, an additional column line in said matrix, said additional row line (M*k*) being fixedly connected to said additional column line, and additional switch means (*zkk*) for selectively connecting the additional column line to said special row line (Mz) and thus for connecting any one of said incoming lines to any one of said dialing information receivers, and switch means (*kk*1 to *kky*) for selectively connecting said additional row line to any of said column lines, so that the incoming lines have access to the subscriber stations of the time multiplex systems.

3. The apparatus of claim 2 further including outgoing lines (*g*L*n*) to remote central offices combined together in a further additional time multiplex communication system (H*g*), which has a further additional row line (M*g*) serving as a multiplex line in its system, and further additional switch means (*gk*1 to *gkg*) for selectively connecting said further additional row line to said column lines for connecting the outgoing central office lines to the subscriber stations of the respective time multiplex systems.

4. The apparatus of claim 1, including signalling means (W, B) for generating signals such as dial tone and the like, each said signalling means having a row line (M*w*, M*b*) of said matrix fixedly connected thereto, and switch means (*wkk* to *wky* and *bkk* to *bky*) for selectively connecting said signalling means to the column lines of the matrix to connect the output of the signalling means to the subscriber stations of the respective time multiplex systems.

References Cited

UNITED STATES PATENTS

| | | | |
|---|---|---|---|
| 2,931,863 | 4/1960 | Faulkner | 179—15 |
| 3,136,863 | 6/1964 | Melvin | 179—18 |
| 3,153,122 | 10/1964 | Faulkner et al. | 179—26 |
| 3,160,712 | 12/1964 | Osborn | 179—18 |

ROBERT L. GRIFFIN, *Primary Examiner.*

C. R. VON HELLENS, *Assistant Examiner.*

U.S. Cl. X.R.

179—18